July 26, 1960 R. J. NELSON 2,946,392
DRAFT LOAD CONTROL FOR TRACTORS
Filed May 7, 1958 2 Sheets-Sheet 1
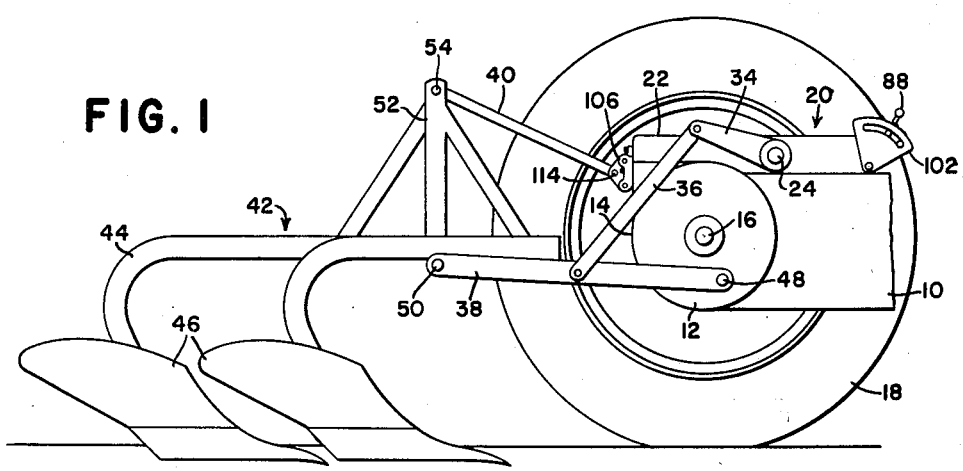
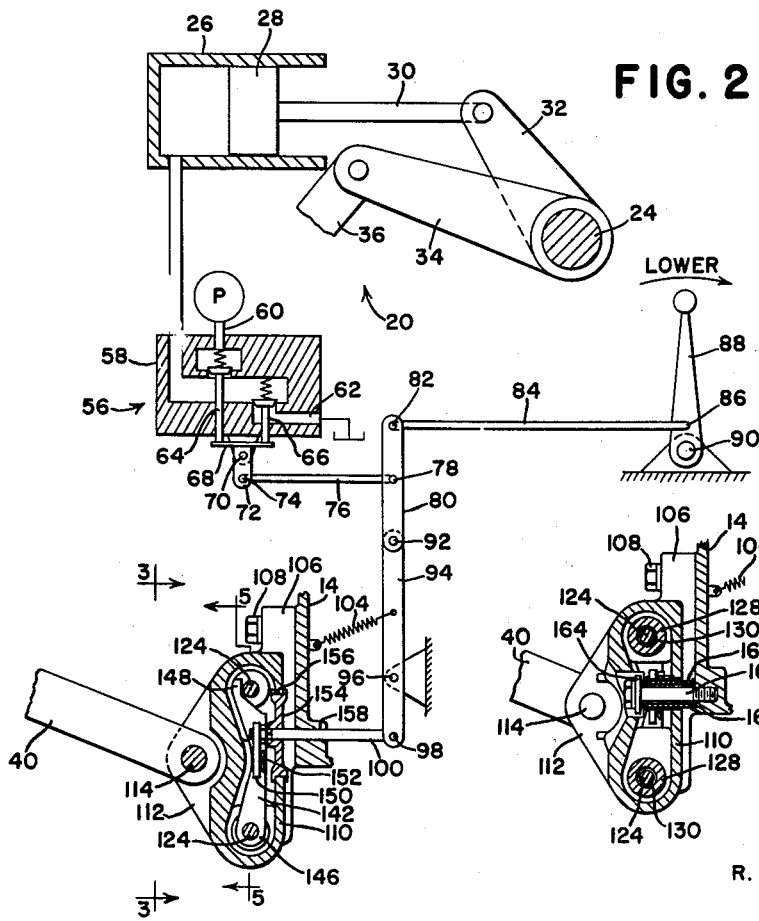
INVENTOR
R. J. NELSON

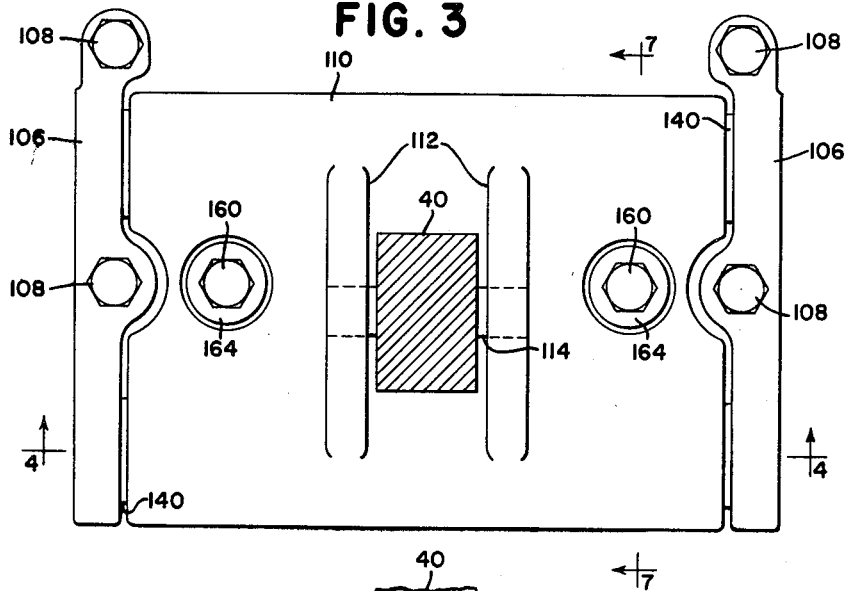
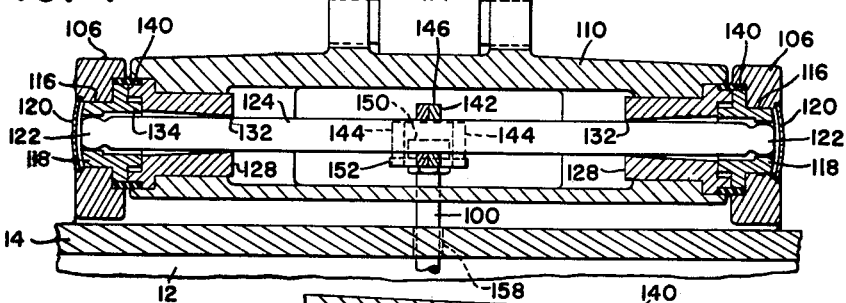
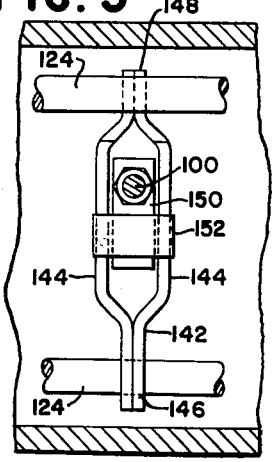
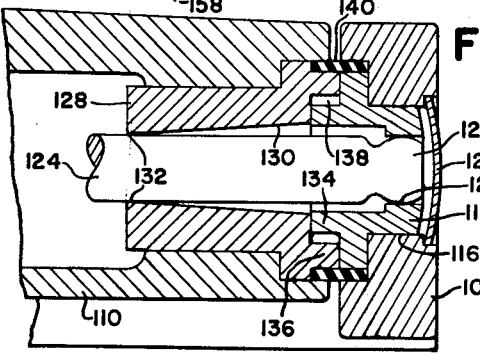
INVENTOR
R. J. NELSON

United States Patent Office 2,946,392
Patented July 26, 1960

2,946,392
DRAFT LOAD CONTROL FOR TRACTORS

Roger J. Nelson, Cedar Falls, Iowa, assignor, by mesne assignments, to Deere & Company, a corporation of Delaware Filed May 7, 1958, Ser. No. 733,749

11 Claims. (Cl. 172—7)

This invention relates to a draft control system for an agricultural tractor and features improvements in the conventional type of draft load control system in which the draft load is balanced against a yielding means in the form of a compression spring and which system includes a power adjusting mechanism actuated by variations in draft load so as to adjust the working depth of the implement so as to maintain a constant draft load.

A system of the general character referred to above is shown basically in the U.S. Patent to Ferguson 1,687,719, wherein variations in normal draft load operate mechanical means for adjusting the working depth of the implement. In the recent past, hydraulic power means has been substituted for the mechanical means of the Ferguson patent, with the usual advantages attendant upon the use of hydraulic circuits. In the present case, reference will be had to the improved system as used with hydraulic control means, but such reference is representative only.

As further representative of the environment in which the invention finds particular utility, there is disclosed here a tractor and plow, the plow being typical of an implement in which draft loads between the tractor and implement are caused to vary by such variables as soil density, wheel slippage etc. Balance of draft load or draft forces has heretofore been achieved by the use of a coiled compression spring operating to resist compressive forces in a top link between the tractor and the implement. It has been found that a compression spring of the character noted leaves much to be desired in the way of sensitivity and economy and according to the present invention the coil spring is replaced by a pair of parallel bars adapted to be stressed in bending so that portions of the bars will be deflected and will be returned to normal in response to variations in draft load. The invention features the use of a pair of bars preferably disposed transverse to the line of advance and having opposite end portions carried on the tractor by means of a pair of spaced apart supports, with midportions of the bars supporting a housing or other element which is connected to one of the draft links of the implement. With this arrangement, draft loads are transmitted to the element, tending to displace the element relative to the supports, and the displacement is yieldingly resisted by the bars. Midportions of the bars will of course deflect and return to normal in response to variations in the bending stresses. The signal member is engaged by or at midportions of the bars and picks up a signal as the bars deflect and return to normal. This signal is transmitted in any conventional manner to the power adjusting means on the tractor, whereby such means is activated or deactivated as the case may be so as to vary the working depth or attitude of the implement.

The invention further features a novel construction in which the element supported by the bars is in the form of a housing which encloses the midportion of the bars as well as part of the force-transmitting connection by means of which a signal is transmitted from the bars to the power adjusting means on the tractor. Another feature of the invention is a supporting arrangement wherein the element or housing has bushings which receive the bars and which are associated with support-carried bushings in such manner as to establish maximum limits on movement of the housing or element as the bars deflect. The invention has for an object improved means for sealing the junctions between element bushings and the support bushings.

The foregoing and other important objects and desirable features inherent in and encompassed by the invention will become apparent as a preferred embodiment of the invention is disclosed in detail in the following specification and accompanying sheets of drawings, the several figures of which are described immediately below.

Fig. 1 is a side elevational view of the rear portion of a tractor and associated implement, the near wheel of the tractor having been removed to disclose the draft system.

Fig. 2 is a schematic view, partly in section, showing the power adjusting means, the actuating means, the signal member and the draft control bars.

Fig. 3 is an enlarged rear view as seen generally along the line 3—3 of Fig. 2.

Fig. 4 is a section as seen along the line 4—4 of Fig. 3.

Fig. 5 is an enlarged section as seen along the line 5—5 of Fig. 2.

Fig. 6 is a fragmentary enlarged section of one end portion showing the mounting of one of the bars.

Fig. 7 is a section on the line 7—7 of Fig. 3 and drawn to the scale of the lower portion of Fig. 2.

The environment chosen for purposes of illustration includes a typical agricultural tractor having a fore-and-aft body 10, the rear portion of which comprises a lubricant-containing housing 12 having a transverse upright rear wall 14. The housing contains right and left hand rear axles, one of which appears at 16, for mounting rear traction wheels, one of which appears at 18.

The tractor includes as a component part thereof a power-adjusting means 20, the basic parts of which are contained in a secondary housing 22 in which is journaled a transverse rockshaft 24. The interior of the secondary housing 22 includes a cylinder 26 within which is a piston 28 that is rod-connected at 30 to an interior arm 32 fixed to the rockshaft 24. A pair of external lift arms, only one of which appears at 34, are secured respectively to opposite outer ends of the rockshaft 24. Each lift arm 34 is connected by a lift link 36 to a lower draft link element 38. There are, typically, two similar links such as the link 38 and these, together with a top link 40, afford in general draft means for connecting a trailing implement 42 to the tractor. The implement shown here is a plow having a frame 44 and a pair of plow bottoms 46.

The forward ends of the draft links 38 are pivotally connected to the tractor on a common transverse axis at 48 and are pivotally connected at their rear ends to the implement on a common transverse axis 50. The implement frame 44 includes as a rigid part thereof a mast 52 to the upper end of which a pivotal connection 54 is effected with the rear end of the top link 40.

The construction to the extent described, may be taken as representative of a typical tractor-implement connection, which is supplemented by some means connected between the top link 40 and the power means 20, so that variations in draft load on the plow or equivalent implement cause the power means to respond in such manner that the draft load is maintained normally uniform. In the prior art, the thrust or compression forces in the top link, such as the top link 40 here, are balanced against a coiled compression spring, and in some cases the same result is achieved by using tensional and compressional forces in the lower link against similar yielding devices. Briefly, what is involved is the transmission of a signal by tensional or compressional loads so that a valve controlling a power lift cylinder is opened or closed to cause the cylinder to raise or lower the implement.

In the present case, the power means 20 includes actuating means 56, here in the form of a valve 58 having a high-pressure inlet 60 connected to a pump P and a reservoir or outlet 62 connected to reservoir. In a typical situation the interior of the rear body part 12 affords the reservoir for the hydraulic system. The valve 58 includes an inlet poppet valve 64 and an outlet poppet valve 66. Both of these are normally biased to closed positions as illustrated. A rockable member 68 is fulcrumed at 70 on the valve box 58 for selective rocking to open one or the other of the poppet valves 64 or 66. An arm 72, rigid on the rockable member 68, is pivotally connected at 74 to a link 76 which in turn is pivotally connected at 78 to the intermediate portion of a lever 80. The upper end of this lever is pivotally connected at 82 to a forwardly extending link 84 which in turn is pivoted at 86 to a hand lever 88 fulcrumed at 90 on a forward portion of the secondary housing 22. Fig. 1 shows a typical arrangement of the hand lever 88, and the same arrangement is depicted schematically in Fig. 2.

The lower end of the lever 80 is fulcrumed at 92 on the upper end of a second lever 94 which is pivoted at 96 intermediate its ends to a supporting part of the tractor as illustrated schematically in Fig. 2. The lower end of the lever 94 is fulcrumed at 98 to the forward end of a signal or force-transmitting element 100.

The hand lever 88 is typically associated with a sector 102 so that any selected angular position thereof is frictionally or otherwise temporarily retained. The lever 94 is normally biased, as by a spring 104, to a position in which slack in the linkage is taken up. In the positions of the parts as shown in Fig. 2, both poppet valves 64 and 66 are closed and fluid ahead of the piston 28 is locked. Consequently, the position of the implement relative to the tractor is fixed via the links 36, arms 34 and immobilized rockshaft 24. If the hand lever 88 is moved forwardly, and assuming that the signal member 100 is stationary so as to fix the position of the pivot or fulcrum 98, the forward force exerted through the link 84 will rock the lever 80 in a clockwise direction about the pivot 92, exerting a forward force through the link 76 on the rockable member 68 to rock that member in a counterclockwise direction so as to raise the poppet valve 66 against its spring. The implement will then descend by its own weight as fluid from ahead of the piston 28 is exhausted at 62. In the typical draft control system, the plow bottoms, upon entering the ground, will encounter soil resistance of a certain magnitude. This, as previously indicated, is balanced against a draft control spring, in the conventional construction, and the signal taken from the thrust in the top link, for example, operates through a signal member such as that shown at 100 here to return the valve to neutral so as to hydraulically lock the power means. In the present arrangement, the system is constructed so that an increase in draft load results in a forward thrust on the compression link 40 which in turn results in a forward displacement of the signal member 100. This thrust will rock the lever 94 in a counterclockwise direction, swinging the lever 80 in a clockwise direction, about its pivotal connection at 82 with the link 84, because in this instance the hand lever position is fixed via the sector 102. Consequently the link 76 rocks the rockable member 68 in a clockwise direction so as to permit the spring behind the poppet valve 66 to close that valve. A decrease in draft load relieves at least part of the thrust in the top link 40 and the signal member 100 is able to move rearwardly so that the situation just described is reversed and the rockable member 68 is rocked in a counterclockwise direction to open the poppet valve 66, whereby the implement descends to an increased depth. When the draft load increases, the increased thrust in the top link acts to shift the signal member 100 forwardly which ultimately results in rocking the rockable member 68 in a clockwise direction so as to open the poppet valve 64, whereby fluid under pressure is supplied to the cylinder for moving the piston 28 forwardly which in turn rocks the rockshaft 24 clockwise to raise the implement to a decreased plowing depth.

The foregoing in its broadest aspects is fairly conventional and the operation of similar systems is clear to those versed in the art. It remains here only to describe the incorporation in this system, or an equivalent system, of the improved yielding means and the mounting thereof.

The present design includes a pair of laterally spaced apart supports or brackets 106 which are rigidly affixed to the rear wall 14 of the tractor as via cap screws 108. A force-receiving element in the form of a housing 110 is disposed intermediate the supports 106 and has means thereon connectible to the implement via the top link 40. This means comprises a pair of laterally spaced apart ears 112 with which a pivotal connection is effected by a pin 114 with the front end of the top link.

The brackets 106 are apertured in transverse alinement at 116 and respectively carry bushings 118. It will be understood that each bracket has upper and lower apertures 116 and accordingly has upper and lower bushings 118. Each aperture is closed at its outer end by a conventional plug 120. The upper and lower bushings 118 in the supports or brackets 106 respectively carry opposite ends 122 of upper and lower elongated bars 124. Each bar is inherently resilient, being constructed of steel, and is normally straight. The opposite ends 122 are rounded as shown to establish interia fulcra 126 (Fig. 6) with interior portions of the support bushings 118.

The bars 124 extend lengthwise through the element or housing 110 and this housing has at each end upper and lower bushings 128, each of which has a tapered interior bore 130 which establishes annular contact at 132 with the proximate portion of the associated bar 124. Since the housing or element 110 carries the bushings 128 and the bushings receive the bars 124, the bars mount the housing on the supports or brackets 106, and the tendency of the housing or element to be deflected in response to variations in forces applied through the top link 40 is yieldingly resisted by the bars 124.

Each pair of associated support bushings 116 and housing bushings 128 includes interengaging portions, 134 on the bushing 118 and 136 on the bushing 128, and these portions are so dimensioned as to afford an annular space at 138 which allows limited lost motion between the two bushings. When this space is taken up, upon deflection of the bars, the portions 134 and 136 engage to establish a stop. The junction between each pair of associated bushings 116—128 is sealed by an annular seal 140, which prevents the entrance of dirt and other foreign material.

The yielding means afforded by the two bars 124 operates in place of the conventional coil compression spring and has several distinct advantages. The bars are more easily and inexpensively constructed; they are readily replaced; they adapt themselves to substantially complete enclosure; and lend themselves to appropriate variation in effective fulcra. In this last named respect, the variation is achieved by virtue of the taper 130 in each element bushing 128, because as the associated bar deflects further and further, more of the taper comes in contact with the bar. That is, the contact at 132 is widened axially of the bar and the moment arm between the contact point and the contact 126 in the support bushing is shortened. Therefore, the sensitivity of the yieldability is cut down as loads increase.

The manner in which the forces in the top link 40 are transmitted to the signal member 100 via the element 110 and bars 124 is best shown in Figs. 2, 4 and 5. The force-transmitting means, which includes the signal member 100, also includes a lever 142, here in the form of a yoke-like elements having spaced arms 144. The lower end of the lever is fulcrumed at 146 on the lower bar 124 and the upper end 148 of the lever engages behind the upper bar 124. The signal member 100 has at a rear portion thereof a depending lug 150 which hooks behind a transverse part 152 that bridges and is rigid with the arms 144 of the lever. As previously described, the motion-transmitting lever 94 is biased by the spring 104 toward a counter-clockwise disposition, which takes up the slack in the connection between the signal member 100 and the lever 142 and thus serves as means to maintain engagement between the upper end 148 of the lever and the upper bar 124.

Completion of the enclosure afforded by the housing 110 is effected by a removable closure member 154 which normally closes an opening 156 in the front wall of the element 110, and this closure slidably carries the signal member 100 for fore-and-aft movement. The rear wall 14 of the tractor-housing part 12 is apertured at 158 to accommodate the signal member 100.

Fig. 7 illustrates a stop means for controlling the maximum displacement of the yieldably supported element or housing 110. This stop means comprises a pair of laterally spaced apart cap screws 160 (see also Fig. 3), each of which passes through a tubular spacer 162 interposed between the rear wall 14 of the tractor housing and a washer 164 at the headed end of the cap screw. The cap screw is threaded into the wall 14 and can be adjusted as by shims 166 so that the washer 164 limits rearward displacement of the element 110 to less than that permitted between the bushings 134 and 136. Forward displacement of the element remains limited by the size of the space 138 between the bushings 134 and 136.

The operation of the arrangement should be clear from the previous description, but it may be well to briefly review it. Under no-load conditions, the bars 124 are normally straight, subject of course to a slight rearward deflection because of the weight of the implement, when the implement is supported in transport position. When the implement is lowered to operating or plowing position, the forces encountered by the plow bottom will be reflected in thrust forces (normally) in the top link 40, and these forces will be transmitted to the element 110 for displacing the element forwardly. The forward displacement is of course yieldingly resisted by the bars 124 so that the draft load may be balanced against the resilience of the bars. As the bars deflect forwardly, the mid-portions thereof will tend to bow, which means that the lever 142 will shift bodily forwardly, entailing also a forward shifting of the signal member 100 under the influence of the spring 104 as it tends to rock the motion-transmitting lever 94 in a counterclockwise direction. This will transmit the signal to the actuating means or valve 56, in a manner previously described. Tension or relaxation of thrust forces in the top link 40 will entail a reverse result.

The foregoing outlines the salient features of the invention. Other features and objects will be readily apparent to those versed in the art or will readily suggest themselves from the preferred embodiment disclosed, all of which may be achieved without departure from the spirit and scope of the invention.

What is claimed is:

1. For a tractor having power adjusting means for effecting the adjustment of an associated implement and actuating means for selectively activating and deactivating the power adjusting means: draft load control means comprising a pair of spaced apart supports on the tractor; a pair of elongated parallel inherently resilient bars extending between and each carried at its opposite end portions by the supports for temporary deflection thereof from normal when stressed in bending; a force-receiving element disposed between the supports and carried by the bars and having means thereon connectible to the implement to receive forces therefrom tending to displace said element relative to the supports and thus to stress the bars in bending; signal means including a part engaged by at least one of the bars and having a force-transmitting connection to the actuating means; and means mounting the signal means for movement in response to deflecting of said one bar.

2. The invention defined in claim 1, in which: the tractor has a rear supporting wall provided with an aperture; the supports are mounted on said wall with the aperture between them; and the force-transmitting connection to the actuating means includes a member extending movably through said aperture.

3. The invention defined in claim 1, in which: the signal means part includes a lever fulcrumed at one end on one bar and bridging the bars to dispose its other end in engagement with the other bar, the force-transmitting connection includes a member engaging the lever and extending to the actuating means, and the mounting means includes means biasing said other end of the lever into engagement with said other bar so that deflection of said other bar in one direction moves the lever and deflection of said other bar in the opposite direction is followed by the lever under action of said biasing means.

4. The invention defined in claim 3, in which: the element includes a portion in the form of a housing at least in part enclosing the lever and the portions of the bars between the supports.

5. The invention defined in claim 4, including: stop means operative between the tractor and the element for limiting displacement of the housing in at least one direction when receiving force from the implement.

6. The invention defined in claim 1, in which: the signal means part includes a yoke-like lever having spaced arms and fulcrumed at one end on one bar and bridging the bars to have its other end engaged with the other bar, the mounting means includes means biasing the lever so as to maintain engagement between said other end of the lever and said other bar so that said other end of the lever follows said bar upon deflection thereof, and the force-transmitting connection includes a member received between the lever arms and engaged by the lever and extending to the actuating means.

7. The invention defined in claim 1, in which: the signal means part includes a member bridging the bars and having opposite ends in engagement with the bars, and the force-transmitting connection includes a member engaging the bridging member and extending to the actuating means.

8. The invention defined in claim 7, in which: the element includes a portion in the form of a housing at least in part enclosing the bridging member and the portions of the bars between the supports.

9. For a tractor having power adjusting means for effecting the adjustment of an associated implement and actuating means for selectively activating and deactivating the power adjusting means: draft load control means comprising a pair of spaced apart supports on the tractor; a pair of elongated parallel inherently resilient bars extending between and each having opposite end portions respectively proximate to the support; each support having a pair of recesses therein respectively coaxial with the proximate bar end portions; a plurality of support bushings, one in each recess and receiving and supporting an associated bar end portion; a force-receiving element disposed between the supports and having means thereon connectible to the implement to receive forces therefrom tending to displace said element relative to the supports, said element having a first pair of bar bushings spaced apart lengthwise of and coaxially receiving one bar and a second pair of bar bushings spaced apart lengthwise of and coaxially receiving the other bar so that implement forces imposed on the element act through the bar bushings to stress the bars in bending; and each bar bushing and the proximate support bushing having loosely inter-engageable portions of different diametrical dimensions operative to limit deflection of the associated bar.

10. The invention defined in claim 9, including: a plurality of annular seals, one surrounding the junction of the inter-engageable portions of each bar bushing and its proximate support bushing.

11. For a tractor having power adjusting means for effecting the adjustment of an associated implement and actuating means for selectively activating and deactivating the power adjusting means: draft load control means comprising a pair of spaced apart supports on the tractor; an elongated inherently resilient bar extending between and having opposite end portions respectively proximate to the supports; each support having a recess therein respectively coaxial with the proximate end of the bar; a pair of support bushings, one in each recess and receiving and supporting an associated bar end portion; a force-receiving element disposed between the supports and having means thereon connectible to the implement to receive forces therefrom tending to displace said element relative to the supports, said element having a pair of bar bushings spaced apart lengthwise of and coaxially receiving the bar so that implement forces imposed on the element act through the bar bushings to stress the bar in bending; and each bar bushing and the proximate support bushing having loosely inter-engageable portions of different diametrical dimensions operative to limit deflection of the bar.

References Cited in the file of this patent

UNITED STATES PATENTS

| | | |
|---|---|---|
| Re. 24,006 | Acton | May 24, 1955 |
| 2,679,199 | Strehlow | May 25, 1954 |
| 2,722,804 | Stickney | Nov. 8, 1955 |
| 2,730,029 | Brundage | Jan. 10, 1956 |
| 2,777,375 | Carlin et al. | Jan. 15, 1957 |